US008014404B2

(12) United States Patent
Eki et al.

(10) Patent No.: US 8,014,404 B2
(45) Date of Patent: Sep. 6, 2011

(54) METHOD AND SYSTEM FOR PRIORITY BASED ROUTING

(75) Inventors: Randy L. Eki, Lake Zurich, IL (US); Surender Kumar, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1690 days.

(21) Appl. No.: 11/241,358

(22) Filed: Sep. 30, 2005

(65) Prior Publication Data

US 2007/0076600 A1 Apr. 5, 2007

(51) Int. Cl.
H04L 12/28 (2006.01)
H04L 12/56 (2006.01)
H04L 1/00 (2006.01)
H04L 12/26 (2006.01)

(52) U.S. Cl. .................. 370/395.41; 370/231; 370/229; 370/230; 370/351

(58) Field of Classification Search ............. 370/395.41, 370/395.21, 237, 238, 392, 408, 468, 229–231, 370/351, 389
See application file for complete search history.

(56) References Cited

U.S. PATENT DOCUMENTS

| | | | |
|---|---|---|---|
| 6,449,588 B1 | 9/2002 | Bowman-Amuah | |
| 6,813,272 B1 | 11/2004 | An et al. | |
| 6,873,839 B2 | 3/2005 | Stanforth | |
| 6,904,275 B2 | 6/2005 | Stanforth | |
| 2002/0093976 A1* | 7/2002 | Razoumov et al. | 370/444 |
| 2004/0157557 A1* | 8/2004 | Barnett et al. | 455/41.2 |
| 2005/0050221 A1 | 3/2005 | Tusman et al. | |
| 2005/0078672 A1 | 4/2005 | Caliskan et al. | |
| 2005/0215284 A1* | 9/2005 | Su et al. | 455/556.2 |

OTHER PUBLICATIONS

Amoussou, "Improvement of Route Cache in DSR Protocol by Predicting Effective Communication Distance Between Nodes", 2006, Department of Electrical Engineering Ecole de Technologie Superieure, all pages.*
Chen, "Distributed Quality of Service Routing in Ad Hoc Netwokrs", 1999, IEEE, all pages. (Note: there are 2 versions from same publisher).*
Johnson, "Dynamic Source Routing in Ad Hoc Wireless Networks", 1996, Carnegie Mellow University, all pages.*
Lin, "Adaptive Clustering for Mobile Wireless Networks", 1997, IEEE Journal on Selected, all pages.* Sathyaraj, "Route Maintenance using Mobility Prediction for Mobile Ad hoc Networks", 2005, IEEE, all pages.*
Lee, "A Proactive Routing Protocol for Multi-Channel Wireless Ad hoc Networks", Jun. 14, 2006, IEEE, all pages.*
Wu, "Route Maintenance in a Wireless Mobile AD Hoc Network", 2000, Maui in 33rd Hawaii International Conference on System Sciences, all pages.*
Zhou, "PRDS: A Priority Based Route Discovery Strategy for Mobile Ad Hoc Networks", 2004, ICT 2004, all pages. (Note, there are 2 versions from same publisher).*

* cited by examiner

*Primary Examiner* — Kwang B Yao
*Assistant Examiner* — Adam Duda
(74) *Attorney, Agent, or Firm* — Randi L. Karpinia; Daniel R. Bestor; Terri S. Hughes

(57) ABSTRACT

A method and system for routing a data packet, intended for a destination node, from a source node to a first intermediate node in a network is useful for improving the efficiency of the network. The method includes determining a priority level for a user of the source node and a priority level for a user of the destination node (step 505). A priority level is also determined for each of the following: a device associated with the source node, a device associated with the destination node, and a device associated with the first intermediate node (step 510). A routing path is then selected that routes the data packet from the source node to the first intermediate node based on a comparison of the priority level for the device associated with the first intermediate node, the priority levels for the users of the source and destination nodes, and the priority levels for the devices associated with the source and destination nodes (step 515).

22 Claims, 4 Drawing Sheets

METHOD AND SYSTEM FOR PRIORITY BASED ROUTING

FIELD OF THE INVENTION

The present invention relates generally to priority based data routing in ad hoc and mesh network communications systems.

BACKGROUND

Many wireless communications systems require a rapid deployment of independent mobile users as well as reliable communications between the users. Mobile Ad Hoc Networks (MANETs) are based on autonomous collections of mobile users who communicate with each other over wireless links having limited bandwidths. MANETs are usually temporary packet radio networks which do not involve significant supporting structure and in which the user nodes themselves perform routing functions.

MANETs provide critical communication services in various environments involving, for example, emergency services supporting police and fire personnel, military applications, and construction sites. Routing communications between two nodes in a static network generally involves simply determining the shortest route between the two nodes. However, in a MANET, the determination of an optimal communication route may involve many additional factors. For example, propagation path losses, interference between users, and channel fading may require the use of an indirect route between two nodes in order to provide an acceptable Quality of Service (QoS) to the network users.

The prior art suggests methods and systems for improved routing between nodes in a MANET based on attributes of devices, such as the potential for delay or latency, so as to improve QoS. Further, the prior art suggests methods for prioritized routing in a MANET based on the battery life of a device at a particular node. For example, if the battery life at a particular node in a network is relatively low, other nodes in the network will deliberately route communications around that node.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages, all in accordance with the present invention.

Figures 1, 2:
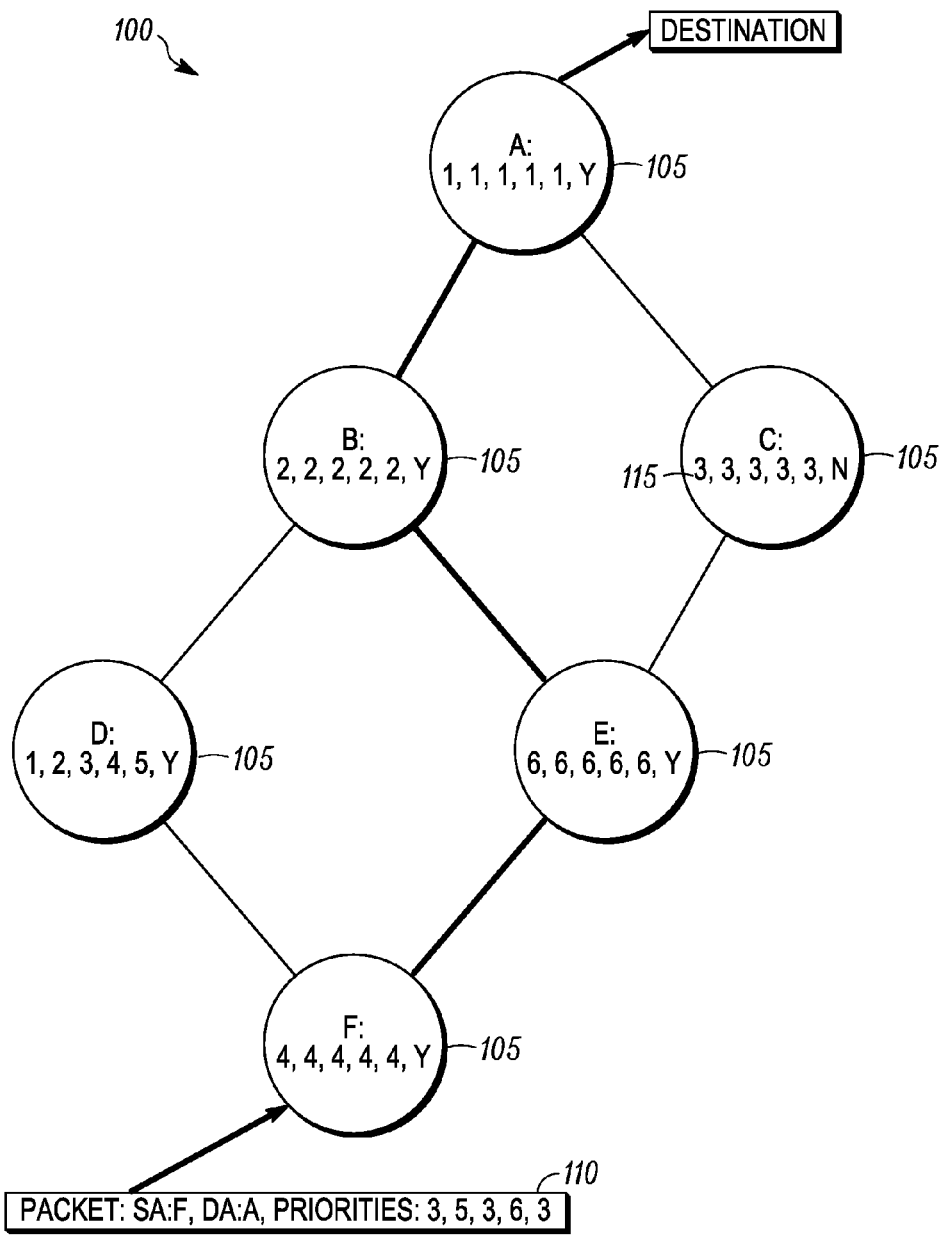
FIG. 1 is a schematic diagram of a communication network comprising a plurality of communication nodes according to an embodiment of the present invention.
FIG. 2 is a table listing five different attributes related to transmission priorities of a data packet according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to priority based routing. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of priority based routing described herein. The non-processor circuits may include, but are not limited to, a radio receiver, a radio transmitter, signal drivers, clock circuits, power source circuits, and user input devices. As such, these functions may be interpreted as steps of a method to perform priority based routing. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

Referring to FIG. 1, there is a schematic diagram of a communication network 100 comprising a plurality of communication nodes 105 according to an embodiment of the present invention. The network 100 may be, for example, a wireless Mobile Ad Hoc Network (MANET), and the nodes 105 may be associated with devices such as mobile phones or handheld radios. Also, fixed nodes 105 may be associated with devices such as routers, for example at a wireless local area network (WLAN) access point (AP) on a light pole in a city. As described in more detail below, a data packet 110 is routed through the network 100 based on a plurality of priority values 115 that are assigned to both the packet itself and to the various nodes 105 through which the packet 110 may be routed.

Referring to FIG. 2, there is a table listing six different attributes 200 related to transmission priorities of a data packet 110 according to an embodiment of the present invention. Each attribute 200 is assigned a priority level which generally has a value 115 between, for example, one and seven. A value 115 of one may thus represent a highest priority level and a value 115 of seven may represent a lowest priority level.

The attributes 200 are related to the transmission of a data packet 110 in various ways. For example, a first attribute 200 labeled "Source" may concern the importance of a sender or initiator of a data packet 110. In an embodiment of the present invention used in a wireless emergency services network 100, a user such as a police chief may be assigned with a highest priority Source attribute 200 equal to a value 115 of one. A lower-ranked user such as a sergeant may be assigned a lower priority level equivalent to a value 115 of three. An attribute 200 labeled "Destination" may concern the importance of a recipient of a data packet 110. An attribute 200 labeled "Device" may concern hardware features, such as battery power, that affect whether a device in a network 100 is appropriate to act as an intermediate node 105 and relay a data packet 110 to another node 105. An attribute 200 labeled "Application" may concern the importance of a software application or service, such as an emergency "911" communication service, which transmitted a packet 110. A further attribute 200 labeled "Time Criticality" may concern the time sensitivity associated with a packet 110. For example, a data packet 110 that is part of a one-way voice communication may incur more delay—and thus have less time sensitivity—than a data packet 110 that is part of a two-way voice communication.

Still another attribute 200 labeled "Routing Override" may concern a manual or automatic feature that, when activated, instructs a node 105 to ignore the priority levels associated with packets 110 and to allow the routing of any packet 110 through that node 105—even where priority levels associated with the packet 110 do not exceed priority levels associated with the node 105.

Therefore, according to an embodiment of the present invention, data traffic that has a high priority, based on attributes associated with both users and devices, is allowed to hop through almost any node 105 in a network 100; whereas low priority traffic is allowed to hop through only low priority nodes 105 and nodes 105 that have their routing override feature activated. Resources such as bandwidth and battery power of higher priority nodes 105 thus can be conserved.

Referring again to FIG. 1, the values 115 of the priority levels of the different nodes 105 are shown at each node 105. For example, the six values 115 assigned to each node 105, reading left to right, may correspond to the values 115 of the six attributes 200 shown in FIG. 2, reading from top to bottom, respectively. Further, the priority levels of a packet 110 are based on the priority levels of users and devices associated with the packet 110 as described herein.

Thus consider a packet 110 that is sent from the "F" node 105 to the "A" node 105 according to FIG. 1. A routing table in the "F" node 105 stores all of the attribute values 115 of its neighboring nodes 105, including the "D" and "E" nodes 105. The "F" node 105 then makes a comparison of the five numerical values 115 assigned to the packet 110 (namely, "3, 5, 3, 6, 3") with the five numerical values 115 assigned, respectively, to the "D" node 105 (namely, "1, 2, 3, 4, 5") and the "E" node 105 (namely, "6, 6, 6, 6, 6"). Because the priority levels of the "E" node 105 are lower than the priority levels of the "D" node 105, and the priority levels of the packet 110 are higher than the priority levels of the "E" node 105, the packet 110 will be routed from the "F" node 105 to the "E" node 105, as indicated in FIG. 1 by the bold arrow.

After the packet 110 has been routed from the "F" node 105 to the "E" node 105, the "E" node needs to determine whether to route the packet through the "B" node 105 or the "C" node 105. A routing table in the "E" node 105 stores all of the attribute values 115 of its neighboring nodes 105, including the "B" and "C" nodes 105. The "E" node 105 then makes a comparison of the five numerical values 115 assigned to the packet 110 (namely, "3, 5, 3, 6, 3") with the five numerical values 115 assigned, respectively, to the "B" node 105 (namely, "2, 2, 2, 2, 2"). The comparison reveals that both the "B" and "C" nodes 105 have higher priority levels (i.e., lower priority values 115) than the priority levels of the packet 110. However, because the "B" node 105 has its override attribute 200 set to "Yes," (and the "C" node 105 has its override attribute 200 set to "No") the "B" node 105 will recognize that it can ignore the comparison of priority levels between the packet 110 and the "B" node 105 and route the packet 110 through the "B" node 105.

Comparisons of priority levels may be accomplished in various ways. For example, according to one embodiment as long as one priority level associated with a data packet 110 exceeds the respective priority level associated with an intermediate node 105, then the packet 110 may be routed through that node 105. According to another embodiment, a packet 110 can be routed through an intermediate node 105 only if all of the priority levels associated with a packet 110 exceed all of the respective priority levels associated with an intermediate node 105. Still another embodiment requires that a majority of intermediate node priority levels need to be exceeded before routing a packet.

Figure 3:
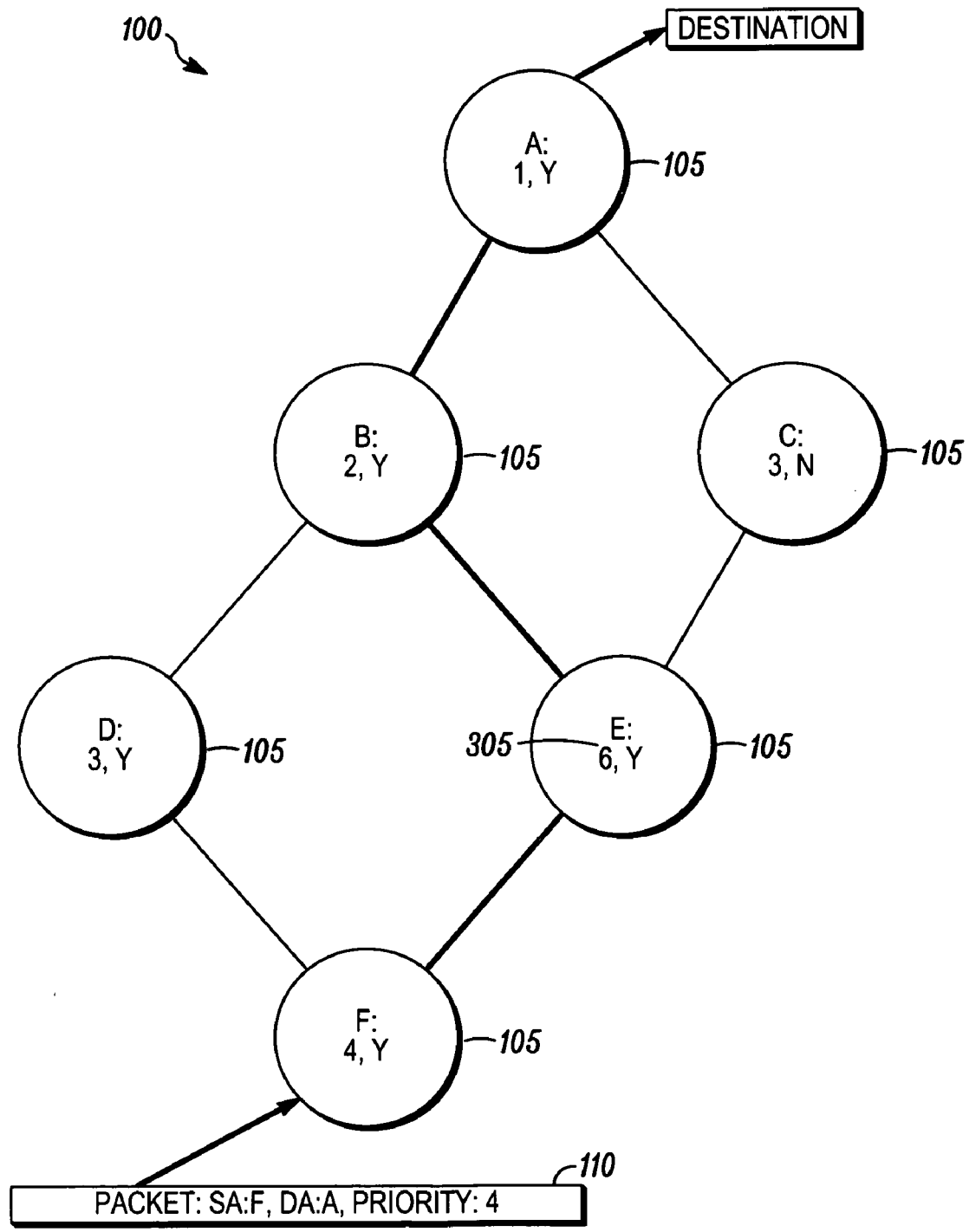
FIG. 3 is a further schematic diagram of a communication network comprising a plurality of communication nodes according to another embodiment of the present invention.

Referring to FIG. 3, there is a further schematic diagram of a communication network 100 comprising a plurality of communication nodes 105 according to another embodiment of the present invention. Here, each node 105 and each data packet 110 in the network 100 is assigned a single aggregated priority value 305 corresponding to a priority level. For example a data packet 110 having an aggregated priority value 305 of four is shown routed from the "F" node 105 to the "E" node 105, because the aggregated priority value of the "E" node is six, which corresponds to an aggregated priority level below that of the packet 110. The aggregated value 305 may be based on an aggregation function that incorporates as variables priority values 115 associated with individual priority attributes 200. Such aggregation functions may include, for example, minimum, maximum, weighted average, and straight average functions.

Figure 4:
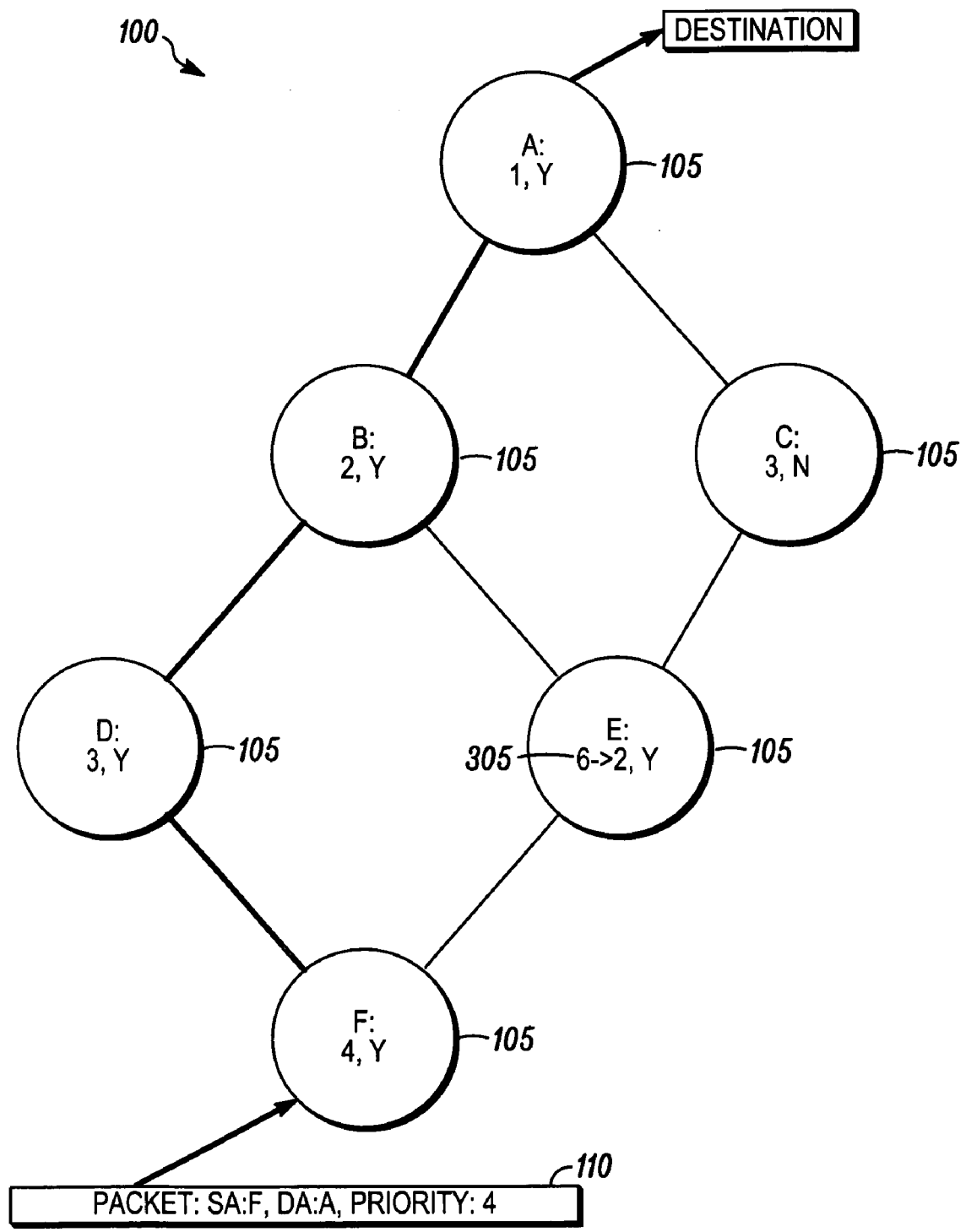
FIG. 4 is a further schematic diagram of a communication network comprising a plurality of communication nodes according to the same embodiment of the present invention shown in FIG. 3.

Referring to FIG. 4, there is a further schematic diagram of a communication network 100 comprising a plurality of communication nodes 105 according to the same embodiment of the present invention shown in FIG. 3. However, in FIG. 4, the aggregated priority value 305 of the "E" node 105 has decreased from six to two—which corresponds to an increased priority level that is higher than the priority level of the packet 110—and so the "F" node 105, based on the information in its routing table, routes the packet 110 to the "D" node 105 and not to the "E" node 105. Such changes in priority levels associated with different attributes 200 of a node 105 may occur frequently based on changes to various factors. Such factors may include, for example: characteristics of a device associated with a node 105 such as an amount of battery power remaining, the number of neighboring nodes 105 within range of a particular node 105, the number of hops required to route a packet 110 through a network 100, the signal strength required to communicate with a nearest neighboring node 105, the relative importance of a user associated with a node 105, and the applications or services running at a node 105.

Those skilled in the art will recognize that the teachings of the present invention are applicable to various types of networks 100 including Mobile Ad Hoc Networks (MANETS) and Mesh networks. Mesh networks concern a network topology where every node 105 in the network 100 is interconnected with every other node 105 in the network 100. Further, those skilled in the art will appreciate that the priority values 115 can be configured in numerous ways. For example, priority levels do not need to be symmetrical between a source and a destination address. Thus, referring again to FIG. 1, the value 115 of the destination attribute 200 of the data packet 110, which has the "A" node 105 as a destination, is set at five. However the source attribute 200 of the "A" node 105 is set to one. Considering a police network 100, the "F" node 105 as a source could be very important if the "F" node 105 is associated with a police commander. The "A" node 105 as a destination could have a relatively lower priority level, such as a destination priority value 115 of five, if the "A" node 105 is associated with a lower ranked individual such as a meter reader. However, where the lower-ranked meter reader acts as a source, the source priority value 115 of the "A" node could be set at a higher priority level associated with a value 115 of four.

Figure 5:
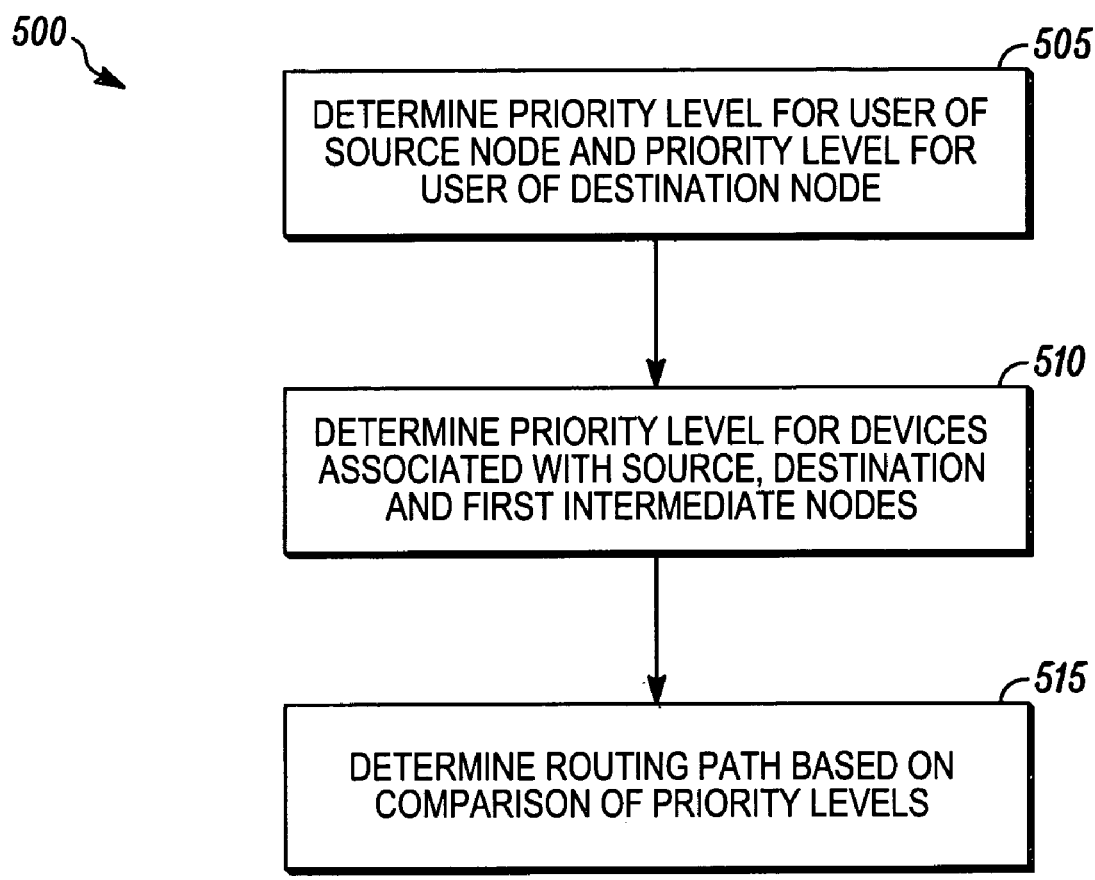
FIG. 5 is a general flow diagram illustrating a method for routing a data packet, intended for a destination node, from a source node to a first intermediate node in a network according to an embodiment of the present invention.

In summary, referring to FIG. 5, there is a general flow diagram illustrating a method 500 for routing a data packet 110, intended for a destination node 105, from a source node 105 to a first intermediate node 105 in a network 100 according to an embodiment of the present invention. At step 505, a priority level is determined for a user of the source node 105 and a priority level is determined for a user of the destination node 105. At step 510, a priority level is determined for each of the following: a device associated with the source node 105, a device associated with the destination node 105, and a device associated with the first intermediate node 105. At step 515, a routing path is then selected that routes the data packet 110 from the source node 105 to the first intermediate node 105 based on a comparison of the priority level for the device associated with the first intermediate node 105, the priority levels for the users of the source and destination nodes 105, and the priority levels for the devices associated with the source and destination nodes 105, as well as the priority levels associated with the application, the time criticality of the data, and the override indicator.

Those skilled in the art will recognize that the present invention can be embodied in a wireless electronic device, such as a device associated with a source node 105. The device can be, for example, a mobile phone, handheld radio device, personal digital assistant (PDA), or notebook computer. The device can include a standard microprocessor or ASIC operatively connected to a computer readable medium such as a random access memory (e.g., SRAM), read only memory (e.g., PROM, EPROM), or hybrid memory (e.g., FLASH) as is well known in the art. The medium then comprises computer readable program code components that, when processed by the microprocessor, are configured to execute the above described steps of the method 500.

Advantages of embodiments of the present invention thus include improved, more efficient, and fairer routing of data packets 110 through a network 100. Because priority levels are determined for both users and devices associated with various nodes 105, improved routing is possible. The increased diversity of priority levels enables more sophisticated and effective routing algorithms. That is because a greater number of attributes 200 related to the transmission of a data packet 110, such as time criticality and application information, provide more sophisticated data to individual nodes 105 concerning the overall operation of a network 100. The nodes 105 are then able to use the data to make improved routing decisions.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for routing a data packet, intended for a destination node, from a source node to a first intermediate node in a network, the method comprising:

determining, by a node, a priority level for a user of the source node and a priority level for a user of the destination node;

determining a priority level for a device associated with the source node, a priority level for a device associated with the destination node, and a priority level for a device associated with the first intermediate node; and selecting a routing path that routes the data packet from the source node to the first intermediate node, rather than to other intermediate nodes capable of routing the data packet, based on a comparison of the priority level for the device associated with the first intermediate node, the priority levels for the users of the source and destination nodes, and the priority levels for the devices associated with the source and destination nodes, wherein the priority levels for the device associated with the first intermediate node, the users of the source and destination nodes, and the devices associated with the source and destination nodes are independent of each other.

2. The method of claim 1 wherein selecting the routing path is further based on a routing override attribute of the intermediate node.

3. The method of claim 1 wherein selecting the routing path is further based on a time criticality attribute associated with the data packet.

4. The method of claim 1 wherein selecting the routing path is further based on an application associated with the data packet.

5. The method of claim 1 wherein the source, destination and intermediate nodes comprise components of a mobile ad hoc network.

6. The method of claim 1 wherein the source, destination and intermediate nodes comprise components of a mesh network.

7. The method of claim 1 wherein a plurality of priority levels associated with a particular node is aggregated into a single priority level for that particular node.

8. The method of claim 1 wherein a plurality of priority levels associated with a node is aggregated using a minimum, a maximum, a straight average, or a weighted average function.

9. The method of claim 1 wherein the routing path is selected based also on deselecting a routing path that routes the data packet from the source node to a second intermediate node based on a comparison of a priority level for a device associated with the second intermediate node, the priority levels for the users of the source and destination nodes, and the priority levels for the devices associated with the source and destination nodes.

10. The method of claim 1 wherein the routing path is selected based also on a priority level for a user of the first intermediate node.

11. The method of claim 1 wherein a priority level changes based on a change to at least one of the following factors: characteristics of a device associated with a node, a number of neighboring nodes within range of a particular node, a number of hops required to route a packet through the network, a signal strength required to communicate with an intermediate node, a relative importance of a user of a node, and applications or services running at a node.

12. A system for routing a data packet, intended for a destination node, from a source node to a first intermediate node in a network, comprising:
non-transitory computer readable medium encoded with computer executable instructions to determine a priority level for a user of the source node and a priority level for a user of the destination node;
non-transitory computer readable medium encoded with computer executable instructions to determine a priority level for a device associated with the source node, a priority level for a device associated with the destination node, and a priority level for a device associated with the first intermediate node; and
non-transitory computer readable medium encoded with computer executable instructions to select a routing path that routes the data packet from the source node to the first intermediate node, rather than to other intermediate nodes capable of routing the data packet, based on a comparison of the priority level for the device associated with the first intermediate node, the priority levels for the users of the source and destination nodes, and the priority levels for the devices associated with the source and destination nodes,
wherein the priority levels for the device associated with the first intermediate node, the users of the source and destination nodes, and the devices associated with the source and destination nodes are independent of each other.

13. The system of claim 12 wherein selecting the routing path is further based on a routing override attribute of the intermediate node.

14. The system of claim 12 wherein selecting the routing path is further based on a time criticality attribute associated with the data packet.

15. The system of claim 12 wherein selecting the routing path is further based on an application associated with the data packet.

16. The system of claim 12 wherein the source, destination and intermediate nodes comprise components of a mobile ad hoc network.

17. The system of claim 12 wherein the source, destination and intermediate nodes comprise components of a mesh network.

18. The system of claim 12 wherein a plurality of priority levels associated with a particular node is aggregated into a single priority level for that particular node.

19. The system of claim 12 wherein a plurality of priority levels associated with a node is aggregated using a minimum, a maximum, a straight average, or a weighted average function.

20. The system of claim 12 wherein the device associated with the source node is of a type selected from the group consisting of mobile phones, handheld radio devices, personal digital assistants (PDAs), and notebook computers.

21. The system of claim 12 wherein a priority level changes based on a change to at least one of the following factors: characteristics of a device associated with a node, a number of neighboring nodes within range of a particular node, a number of hops required to route a packet through the network, a signal strength required to communicate with an intermediate node, a relative importance of a user of a node, and applications or services running at a node.

22. A system for routing a data packet, intended for a destination node, from a source node to a first intermediate node in a network, comprising:
means for determining a priority level for a user of the source node and a priority level for a user of the destination node;
means for determining a priority level for a device associated with the source node, a priority level for a device associated with the destination node, and a priority level for a device associated with the first intermediate node; and
means for selecting a routing path that routes the data packet from the source node to the first intermediate node, rather than to other intermediate nodes capable of routing the data packet, based on a comparison of the priority level for the device associated with the first intermediate node, the priority levels for the users of the source and destination nodes, and the priority levels for the devices associated with the source and destination nodes,
wherein the priority levels for the device associated with the first intermediate node, the users of the source and destination nodes, and the devices associated with the source and destination nodes are independent of each other.

* * * * *

UNITED STATES PATENT AND TRADEMARK OFFICE
CERTIFICATE OF CORRECTION

| | | |
|---|---|---|
| PATENT NO. | : 8,014,404 B2 | Page 1 of 1 |
| APPLICATION NO. | : 11/241358 | |
| DATED | : September 6, 2011 | |
| INVENTOR(S) | : Eki et al. | |

It is certified that error appears in the above-identified patent and that said Letters Patent is hereby corrected as shown below:

Title Page, Item (56), under "OTHER PUBLICATIONS", in Column 2, Line 5, delete "Netwokrs"," and insert -- Networks", --, therefor.

Title Page, Item (56), under "OTHER PUBLICATIONS", in Column 2, Lines 11-13, delete "Sathyaraj,.... pages.*" and insert the same as a new Entry.

In Column 5, Line 12, delete "anode" and insert -- a node --, therefor.

In Column 5, Line 16, delete "(MANETS)" and insert -- (MANETs) --, therefor.

Signed and Sealed this
Twenty-fifth Day of December, 2012

David J. Kappos
*Director of the United States Patent and Trademark Office*